United States Patent [19]
Um et al.

[11] Patent Number: 5,150,205
[45] Date of Patent: * Sep. 22, 1992

[54] ACTUATED MIRROR OPTICAL INTENSITY MODULATION

[75] Inventors: Gregory Um, Torrance; Andrei Szilagyi, Brentwood, both of Calif.

[73] Assignee: Aura Systems, Inc., Los Angeles, Calif.

[*] Notice: The portion of the term of this patent subsequent to Jun. 30, 2009 has been disclaimed.

[21] Appl. No.: 429,987

[22] Filed: Nov. 1, 1989

[51] Int. Cl.$^5$ .......................... H04N 9/31; H04N 5/74
[52] U.S. Cl. ......................................... 358/60; 358/62; 358/233; 359/209; 359/618; 359/197
[58] Field of Search ..................... 358/60-62, 358/231-234; 350/169, 174, 162.23, 6.1, 6.2; 359/618, 572, 573, 196, 197, 209

[56] References Cited

U.S. PATENT DOCUMENTS

| | | | |
|---|---|---|---|
| 3,507,984 | 4/1970 | Stavis | 358/63 |
| 3,510,571 | 5/1970 | Biedermann | 178/5.4 |
| 3,549,800 | 12/1970 | Baker | 358/63 |
| 3,760,096 | 9/1973 | Roth | 178/5.4 |
| 4,150,396 | 4/1979 | Hareng et al. | 358/60 |
| 4,213,146 | 7/1980 | Maiman | 358/63 |
| 4,441,791 | 4/1984 | Hornbeck . | |
| 4,566,935 | 1/1986 | Hornbeck . | |
| 4,571,603 | 2/1986 | Hornbeck et al. . | |
| 4,615,595 | 10/1986 | Hornbeck . | |
| 4,638,309 | 1/1987 | Ott . | |
| 4,680,579 | 7/1987 | Ott . | |
| 4,705,361 | 11/1987 | Frazier et al. . | |
| 4,710,732 | 12/1987 | Hornbeck . | |
| 4,856,863 | 8/1989 | Sampsell et al. . | |
| 4,859,012 | 8/1989 | Cohn . | |
| 4,956,619 | 9/1990 | Hornbeck . | |
| 4,979,030 | 12/1990 | Murata | 358/60 |
| 5,028,939 | 7/1991 | Hornbeck et al. . | |

OTHER PUBLICATIONS

Television—A New Schlieren Light Valve for Television Projection, by Van Raalte, Applied Optics, vol. 9, No. 10, Oct. 1970, pp. 2225-2230.

The Mirror-Matrix Tube: A Novel Light Valve for Projection Display, by Thomas et al., IEEE Transactions on Electron Devices, vol. ED-22, No. 9, Sep. 1975, pp. 765-775.

Dynamic Micromechanics on Silicon: Techniques and Devices, by Petersen, IEEE Transactions on Electron Devices, vol. ED-25, No. 10, Oct. 1978, pp. 1241-1250.

TV Projection Display Using an Amorphous-Se-Type Ruticon Light Valve, by Lakatos et al., IEEE Transactions on Electron Devices, vol. ED-24, No. 7, Jul. 1977, pp. 930-934.

Micromechanical Light Modulator Array Fabricated on Silicon, by Petersen, Applied Physics Letters, vol. 31, No. 8, Oct. 15, 1977, pp. 521-523.

*Primary Examiner*—James J. Groody
*Assistant Examiner*—Glenton B. Burgess
*Attorney, Agent, or Firm*—Poms, Smith, Lande & Rose

[57] ABSTRACT

A television display apparatus wherein a white light source emits a beam onto a plurality of dichroic mirrors which split the beam into three beams of the primary colors, then reflects the three primary beams onto three deformable reflective surfaces, which again reflect the beams through slits in a non-reflective surface, thereby modulating the intensity of the beams. The amount of light passing through the slits is horizontally scanned by one surface of a rotating polygonal mirror, then passes through collimating and projection lenses and onto a screen.

46 Claims, 2 Drawing Sheets

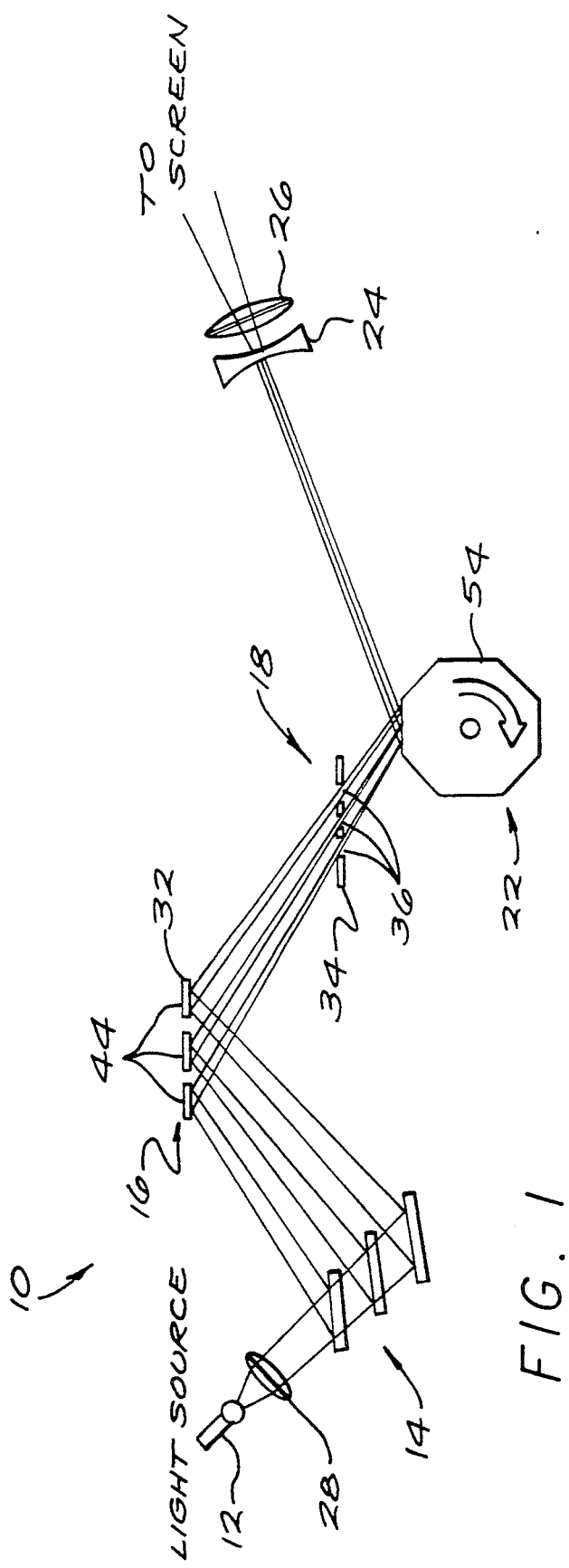
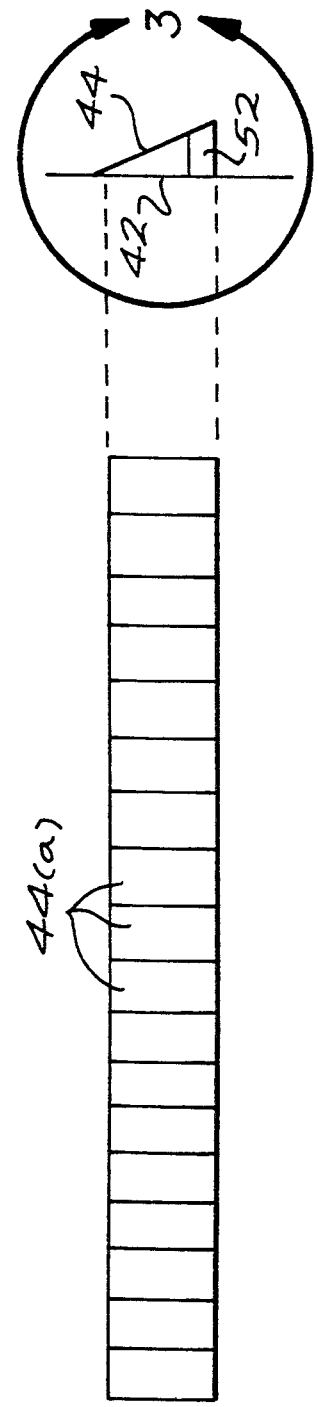
FIG. 1
FIG. 2

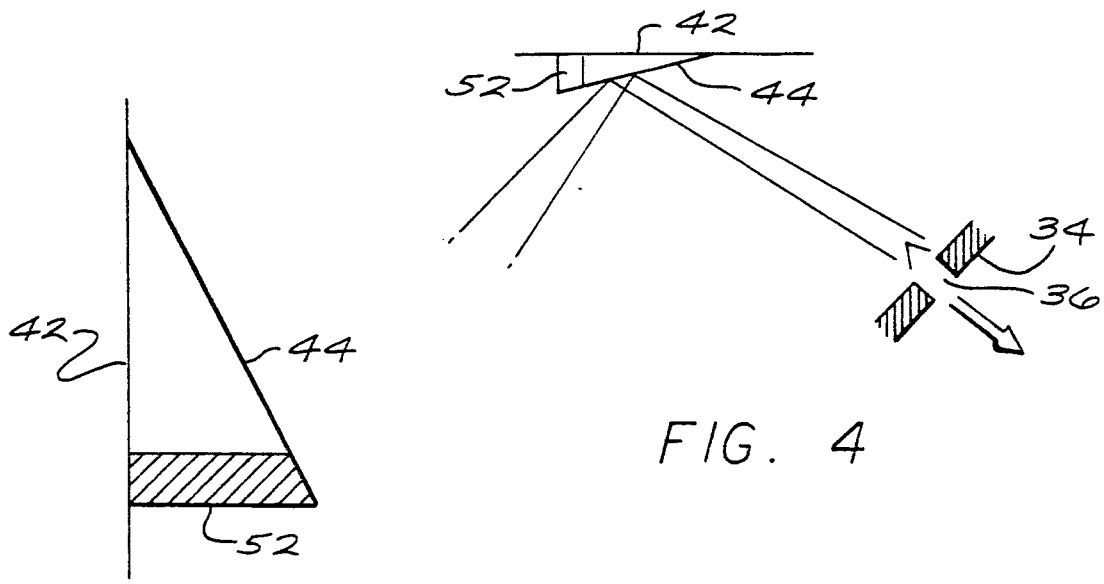
FIG. 3
FIG. 4
FIG. 5
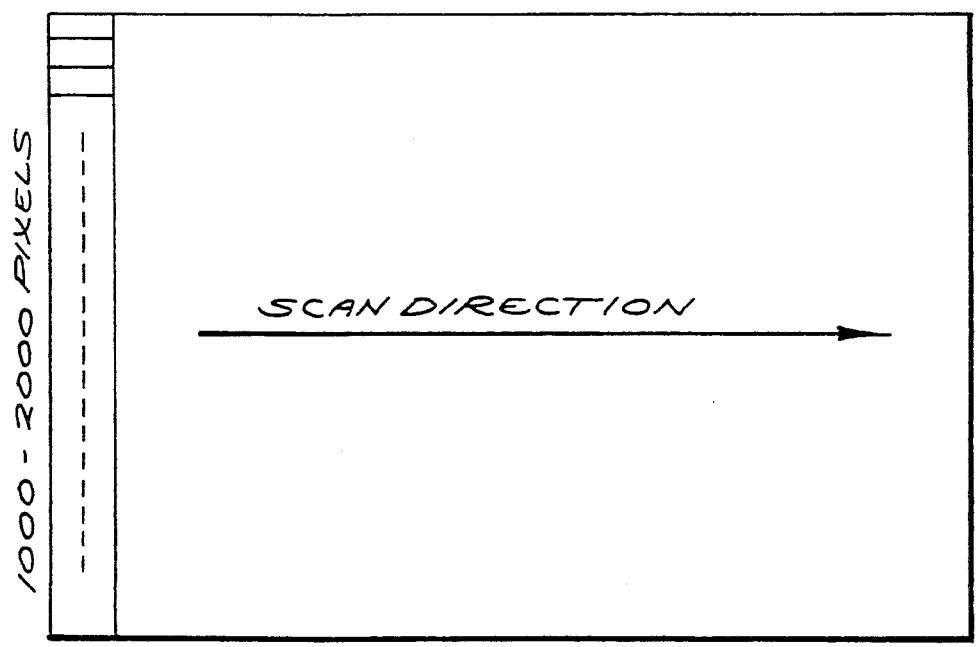

ACTUATED MIRROR OPTICAL INTENSITY MODULATION

BACKGROUND OF THE INVENTION

The present invention generally relates to a unique television display apparatus and, more specifically, to a television display apparatus which reflects light beams off of a mirror array and through slits in a non-reflective surface in order to modulate the intensity of the projected beams.

It is well known in the prior art to produce a television display by modulating beams of light in accordance with electrical signals received from a control system. The modulated beams of light are then converted into images by an optical scanning mechanism.

In order to create a color display, three beams of light must be modulated, one in each of the primary colors, red, green and blue. It is also well known in the art to split a white light beam into three primary colored beams. For example, in Stavis, U.S. Pat. No. 3,507,984, an argon laser beam is passed through a prism in order to split the beam into blue and green beams. In Biedermann, U.S. Pat. No. 3,510,571, a light source is split into three primary colored beams by passing the beam through interference mirrors and filters.

The beams of light are then typically modulated by conventional light modulators. This invention discloses a optical modulation television which will not require these conventional modulators.

It is known in the art to use rotating reflective surfaces in order to provide horizontal sweep. In Biedermann, the optical system for horizontal scan includes a rotating polygonal prism. In Roth, U.S. Pat. No. 3,760,096, the optical system for horizontal sweep includes a rotating pyramidal mirror.

SUMMARY OF THE INVENTION

This invention relates to a television display apparatus, and more particularly to a television display apparatus comprising a white light source having a collimation lens; means for splitting said white light into three primary light beams; means for spreading said primary light beams; a non-reflective surface having apertures therein; means for providing horizontal sweep of the light beams onto the screen; a second collimation lens; and a projection lens. Accordingly, it is the object of this invention to provide a unique optical modulation television which replaces a conventional light modulator with the combination of a mirror array and a non-reflective surface with apertures therein.

The foregoing and other objects, features and advantages of this invention will be apparent from the following, more particular, description of the preferred embodiments of this invention, as illustrated in the accompanying drawings.

BRIEF DESCRIPTION OF THE DRAWINGS

FIG. 1 is a diagrammatic view of the unique modulation television.

FIG. 2 is a top and a side view of one reflective surface of the mirror array.

FIG. 3 is an enlarged side view of one reflective surface of the mirror array.

FIG. 4 is diagrammatic side view of the light beam, tilt mirror array and non-reflective surface with apertures.

FIG. 5 is a graph of horizontal scan direction of the pixels.

DESCRIPTION OF THE PREFERRED EMBODIMENT

Referring now to the accompanying drawings which set forth the present invention in greater detail and in which like numerals designate like features, FIG. 1 shows a unique modulation television 10 which comprises a white light source 12, means 14 for splitting said white light into three primary beams, means 16 for spreading each of said primary beams into a bell-shaped beam, means 18 for clipping said bell-shaped beams, horizontal scanning means 22, a second collimation lens 24, and a projection lens 26. In operation, the light source 12 emits a high intensity white light which passes through a first collimation lens 28 to form a collimated light beam. The collimated light beam illuminates the splitting means 14 which breaks the white light into three primary light beams, each being one of the primary colors; red, green and blue. In the preferred embodiment, the splitting means is a plurality of dichroic mirrors 14. However, in alternative embodiments, either a diffraction grating or a prism could be used to split the collimated white light beam into three primary light beams. In another embodiment, the white light source 12, the first collimating lens 29, and the splitting means 14 could be replaced by three coherent lasers, each being one of the primary colors.

In order to modulate the beams to their desired intensity, the spreading means 16 and clipping means 18 are used in combination. In the preferred embodiment, the spreading means 16 is comprised of a mirror array 32 and the clipping means 18 is comprised of a non-reflective surface 34 with a plurality of apertures 36 therein. The plurality of apertures 36 may either be a plurality of pinholes or a plurality of knife-edged slits.

As best shown in FIG. 3, a flat rigid base 42 is used to support a reflective surface 44 of the mirror array 32. The mirror array 32 is comprised of three reflective surfaces 44, with one reflective surface 44 for each of the primary light beams. For each reflective surface 44, a piezoelectric crystal 52 is layered onto the flat rigid base 42. The reflective surface 44 is then layered on top of the piezoelectric crystal 52 and the flat rigid base 42. The reflective surface 44 is attached at one end to the flat rigid base 42, and at the opposite end to the piezoelectric crystal 52. Alternatively, the reflective surface 44 may be clamped to the flat rigid base 42. The layered flat rigid base 42, piezoelectric crystal 52, and reflective surface 44 are then divided into segments to form a plurality of disjointed reflective surfaces 44(a). Each of the disjointed reflective surfaces 44(a) comprises a pixel.

When a voltage is applied to the piezoelectric crystal 52, the crystal 52 deforms causing the reflective surface 44 to tilt. As an alternative, a constant frequency, varying voltage can be applied to the crystal 52 which causes the reflective surface 44 to vibrate with a controllable amplitude. In another alternative embodiment of the invention, the reflective surface 44 is mounted upon a bimorphic piezoelectric crystal layer. Each layer has an electrode on one end. A different voltage is applied to each crystal layer, causing one layer to expand, while the other layer contracts. As a result, the reflective surface 44 bends. The control voltage is applied to the piezoelectric material or crystal layer similar to conventional video display technology by electronic control circuitry similar to that used in a bit mapped memory.

In another embodiment of the invention, each disjointed reflective surface 44(a) is shaped with a plurality of notches located near the ends of the disjointed reflective surface 44(a). The notches will allow heat expansion of the reflective surface 44 without any resulting deformation of the reflective surface 44.

As best shown in FIG. 3, each of these primary color beams illuminate a respective segment 44(a) of each reflective surface 44 of the mirror array 32. Each reflective surface 44 is tilted, vibrated, or bent at an angle in accordance with the predetermined intensity of the pixel.

The beams reflected from the moving reflective surface 44 are spread into a bell-shaped beam. The flux and reflected angle of the bell-shaped beam is controlled for intensity modulation. To complete the intensity modulation, the bell-shaped beams are then reflected toward the clipping means 18, which in the preferred embodiment is the non-reflective surface 34. When a voltage is not applied to the piezoelectric crystals 52, the reflective surfaces 44 do not vibrate, tilt, or bend, and the beams reflected off of the mirror array 32 either do not spread or are aimed directly at the apertures 36 of the non-reflective surface 34. If the reflected beams are aimed directly at the apertures 32, a maximum amount of light from the reflected beams will pass through the apertures 36. However, when a voltage is applied to the piezoelectric crystals 52, the reflective surfaces 44 vibrate, tilt, or bend, depending on the embodiment used, and cause the beams reflecting off of the mirror array 32 to spread into bell-shaped beams. Therefore, only a restricted amount of light from the reflected beams pass through the plurality of apertures 36. The amount of light which passes through the plurality of apertures 36 determines the intensity of the respective pixels and colors. The apertures 36 can be pinholes or knife-edged slits.

In an alternative embodiment of the invention, the non-reflective surface 34 with the plurality of apertures 36 further includes a plurality of wire strips. Each aperture 36 contains a wire strip located within. The wire strips are located within the apertures 36 so that when no voltage is applied to the piezoelectric crystals 52, the light beams reflected off the mirror array 32 are blocked from passing through the apertures 36 by the wire strips within the apertures 36. When a voltage is applied to the piezoelectric crystals 52, the light beams reflected off the mirror array 32 are spread into bell-shaped beams. Because the beams are spread, a restricted amount of light passes around the wire strips and through the apertures 36. This amount of light which passes through each aperture 36 determines the intensity of that primary color beam.

The beams which pass through the plurality of apertures 36 of the non-reflective surface 34 then impinge upon the horizontal scanning means 22. In the preferred embodiment of the invention, the horizontal scanning means 22 is a polygonal rotating mirror 54. The beams reflect simultaneously off of one surface of the polygonal mirror 54 to provide a horizontal sweep of the column of pixels from each reflective surface 44 of the mirror arrays 32. In an alternative embodiment, the horizontal scanning means is a galvanometer mirror, also known in the art as a galvo mirror.

In another embodiment, the horizontal scanning means is a rotating holographic plate.

In another alternative embodiment, the scanning is accomplished by aligning the reflective surfaces 44 of the mirror array 32 and scanning the row of pixels on each reflective surface 44 vertically.

In an alternative embodiment, the horizontal scanning means 22 is eliminated by the use of a two-dimensional mirror array. The two-dimensional mirror array is formed by cascading a plurality of reflective surfaces 44, then dividing the reflective surfaces 44 into segments both horizontally and vertically, thereby forming a grid of segments. The apertures 36 are also formed in a two-dimensional grid on a non-reflective surface. One two-dimensional reflective surface is required for each primary light beam reflected off the splitting means 14. The use of the two-dimensional mirror array, and two-dimensional apertures grid covers the whole image field instantaneously, thereby eliminating the need for the horizontal scanning means 22.

The scanned beams are then passed through a second collimation lens 24 and a projection lens 26 in order to project an image upon the screen.

While the invention has been particularly shown and described in reference to the preferred embodiments thereof, it will be understood by those skilled in the art that changes in form and details may be made without departing from the scope of the invention.

We claim:

1. A television display apparatus comprising:
    a source for emitting a white light;
    means for splitting said white light into a plurality of primary light beams, each of said primary light beams being one of the primary colors;
    means for spreading each of said primary light beams into a bell-shaped beam;
    means for clipping the profile of each of said bell-shaped beams into a clipped beam;
    means for horizontally scanning each of said clipped beams simultaneously;
    means for collimating said scanned light into a collimated beam; and
    means for projecting said collimated beam onto a screen.

2. A television display apparatus in accordance with claim 1 wherein said white light is passed through a first collimation lens in order to collimate it.

3. A television display apparatus in accordance with claim wherein said splitting means is a plurality of dichroic mirrors.

4. A television display apparatus in accordance with claim 1 wherein said splitting means is a diffraction grating.

5. A television display apparatus in accordance with claim 1 wherein said splitting means is a prism.

6. A television display apparatus in accordance with claim 1 wherein said spreading means is a mirror array.

7. A television display apparatus in accordance with claim 1 wherein said spreading means further comprises a means for altering the direction which the bell-shaped beams are reflected.

8. A television display apparatus in accordance with claim 6 wherein said spreading means further comprises a means for deforming each reflective surface of said mirror array in response to signals received by the electrical control circuitry.

9. A television display apparatus in accordance with claim 8 wherein each reflective surface of said mirror array is layered on both a flat rigid base and said deforming means.

10. A television display apparatus in accordance with claim 9 wherein each reflective surface of said mirror array is attached at one end to said flat rigid base and at the opposite end to said deforming means.

11. A television display apparatus in accordance with claim 8 wherein each reflective surface is attached at both ends to said deforming means.

12. A television display apparatus in accordance with claim 8 wherein said deforming means is a piezoelectric crystal which deforms when a voltage is applied.

13. A television display apparatus in accordance with claim 6 wherein each reflective surface of said mirror array is mounted on a top surface of a bimorphic piezoelectric crystal layer, said bimorphic crystal layer having one layer which expands when a voltage is applied and one layer which contracts when a voltage is applied, thereby bending said mirror when a voltage is applied.

14. A television display apparatus in accordance with claim 1 wherein said clipping means is a non-reflective surface with a plurality of apertures therein.

15. A television display apparatus in accordance with claim 14 wherein said plurality of apertures is a plurality of pinholes.

16. A television display apparatus in accordance with claim 14 wherein said plurality of apertures is a plurality of knife-edged apertures.

17. A television display apparatus in accordance with claim 14 wherein said clipping means further comprises a plurality of wire strips, one of said wire strips being located within each of said plurality of apertures.

18. A television display apparatus in accordance with claim 1 wherein said horizontal scanning means is a rotating polygonal mirror of which said plurality of clipped beams simultaneously reflect off of one side of said polygon.

19. A television display apparatus in accordance with claim 1 wherein said horizontal scanning means is a galvanometer mirror.

20. A television display apparatus in accordance with claim 1 wherein said horizontal scanning means is a rotating holographic plate.

21. A television display apparatus in accordance with claim 1 wherein said means for collimating said beams is a second collimation lens.

22. A television display apparatus in accordance with claim 1 wherein said means for projecting said beams is a projection lens.

23. A television display apparatus comprising:
a source for emitting white light;
means for splitting said white light into a plurality of primary light beams, each of said primary light beams being one of the primary colors;
means for spreading each of said primary light beams into a bell-shaped beam;
means for clipping the profile of each of said bell-shaped beams into a clipped beam;
means for collimating said clipped beam into a collimated beam; and
means for projecting said collimated beam onto a screen.

24. A television display apparatus in accordance with claim 23 wherein said spreading means is a two-dimensions mirror array.

25. A television display apparatus in accordance with claim 23 wherein said means for clipping is an array of apertures in a non-reflective surface.

26. A method for projecting an image onto a screen comprising the steps of:
splitting a white light beam into three primary beams, one of each primary beams being one of the primary colors;
spreading each of the primary beams into a bell-shaped beam;
passing said bell-shaped beams through apertures in a non-reflective surface, thereby modulating the intensity of said bell-shaped beams;
horizontally scanning said beams simultaneously;
collimating said scanned beams into a collimated projecting said collimated beam onto a screen.

27. A television apparatus comprising:
a source of light wherein said light is formed into a beam;
a reflective surface upon which said beam is incident, said reflective surface being deformable such that the degree of deformation of said reflective surface is commensurate with a predetermined intensity of a pixel to be displayed;
a non-reflective surface having an aperture therein, said reflective surface directing said beam generally towards said aperture such that the flux of said beam passing through said aperture decreases with an increasing degree of deformation of said reflective surface to control an intensity of said beam; and
a projection lens upon which said beam is incident subsequent of passing through said aperture to project said beam on a screen whereby said pixel is displayed.

28. A television apparatus as set forth in claim 27 wherein the deformation of said reflective surface is a tilting of said reflective surface.

29. A television apparatus as set forth in claim 27 wherein the deformation of said reflective surface is a bending of said reflective surface.

30. A television apparatus as set forth in claim 2 wherein the deformation of said reflective surface is a vibration of said reflective surface.

31. A television apparatus as set forth in claim 27 further comprising:
a mirror in a path of said beam interposed said non-reflective surface and said projection lens, said mirror being movable to sweep said beam such that a plurality of pixels are displayed.

32. A television apparatus comprising:
a source of light wherein said light is formed into a beam;
an array of reflective surfaces upon which said beam is incident, each of said reflective surfaces being deformable with the degree of deformation of each of said surfaces being commensurate with a predetermined intensity of a corresponding one of a plurality of pixels to be displayed;
a non-reflective surface having a plurality of apertures therein, each of said reflective surfaces directing a corresponding one of a plurality of reflective beams generally to a respective one of said apertures such that the flux of each of said reflected beams passing through said respective one of said apertures decreases with an increasing degree of movement of a corresponding one of said reflective surfaces to control an intensity of each of said beams; and
a projection lens which each of said reflected beams are incident subsequent to passing through said apertures to project said reflected beams on a screen whereby said pixels are displayed.

33. A television apparatus as set forth in claim 32 wherein the deformation of each of said reflective surfaces is a tilting of each of said surfaces.

34. A television apparatus as set forth in claim 32 wherein the deformation of each of each of said reflective surfaces is a bending of each of said reflective surfaces.

35. A television apparatus as set forth in claim 32 wherein said deformation of each of said reflective surfaces is a vibration of each of said reflective surfaces.

36. A television apparatus as set forth in claim 32 further comprising:
a mirror in a path of said beam interposed said non-reflective surface and said projection lens, said mirror being movable to sweep said beam such that a plurality of pixels are displayed, said array of reflective surfaces being a linear array, said reflective beam from each of said reflective surfaces being simultaneously incident on said mirror.

37. A method for displaying a pixel on a screen comprising steps of:
forming a light beam;
illuminating a reflective surface with said light beam;
deforming said reflective surface wherein the degree of deformation of said reflective surfaces commensurate with a predetermined intensity of said pixel;
directing a reflected beam from said reflective surface through an aperture within a non-reflective surface such that the flux of said reflected beam passing through said aperture decreases with an increasing degree of said deformation of said reflective surface to control an intensity of said beam; and
projecting said reflected beam subsequent to passing through said aperture on a screen whereby said pixel is displayed.

38. A method as set forth in claim 37 wherein said deforming step includes the substep of tilting said reflecting surface.

39. A method as set forth in claim 37 wherein said deforming step includes the substep of bending said reflective surface.

40. A method as set forth in claim 37 wherein said deforming step includes the substep of vibrating said reflective surface.

41. A method as set forth in claim 37 further comprising the step of:
moving a mirror in a path of said beam wherein said mirror is interposed said non-reflective surface and said projection lens to sweep said beam such that a plurality of pixels are displayed.

42. A method for displaying a plurality of pixels on a screen comprising steps of:
forming a light beam;
illuminating a plurality of reflective surfaces with said beam;
deforming each of said reflective surfaces wherein the degree of deformation of each of said reflective surfaces is commensurate with a predetermined intensity of one of said pixels;
directing the reflected beam from each of said reflective surfaces to one of a plurality of apertures, wherein each of said apertures corresponds to one of said reflective surfaces, such that the flux of each of said reflective beams passing through of said corresponding one of said reflective surfaces to control an intensity of reflected beams; and
projecting each of said reflective beams subsequent to passing through said corresponding one of said apertures one a screen whereby said pixels are displayed.

43. A method as set forth in claim 42 wherein said deforming step includes the substeps of tilting each of said reflective surfaces.

44. A method as set forth in claim 42 wherein said deforming step includes the substeps of bending each of said reflective surfaces.

45. A method as set forth in claim 42 wherein said deforming step includes the substeps of vibrating each of said reflective urfaces.

46. A method as set forth in claim 42 further comprising the step of:
moving a mirror in a path of said beam wherein said mirror is interposed said nonreflective surface and said projection lens to sweep each of said reflected beams such that a plurality of pixels are displayed from each of said reflective beams, said array of reflective surfaces being a linear array.

* * * * *